(No Model.)

F. X. SPITZNAGEL.
FILTER.

No. 312,527. Patented Feb. 17, 1885.

WITNESSES:
Fred. G. Dieterich
Geo. E. Frech

Frank X. Spitznagel
INVENTOR.
By Louis Bagger & Co.
ATTORNEYS.

UNITED STATES PATENT OFFICE.

FRANK XAVER SPITZNAGEL, OF BUFFALO, NEW YORK.

FILTER.

SPECIFICATION forming part of Letters Patent No. 312,527, dated February 17, 1885.

Application filed August 2, 1884. (No model.)

*To all whom it may concern:*

Be it known that I, FRANK X. SPITZNAGEL, a citizen of the United States, and a resident of Buffalo, in the county of Erie and State of New York, have invented certain new and useful Improvements in Filters; and I do hereby declare that the following is a full, clear, and exact description of the invention, which will enable others skilled in the art to which it appertains to make and use the same, reference being had to the accompanying drawings, which form a part of this specification.

This invention relates to that class of filters in which the filtering material is confined between perforated plates, one body of filtering material at each end of the casing, and in which the casing is provided with inlets and outlets at the ends of the casing, and with an outlet at the middle of the casing; and it consists in the improved construction and combination of parts of such a filter, as hereinafter more fully described and claimed.

Figure 1:
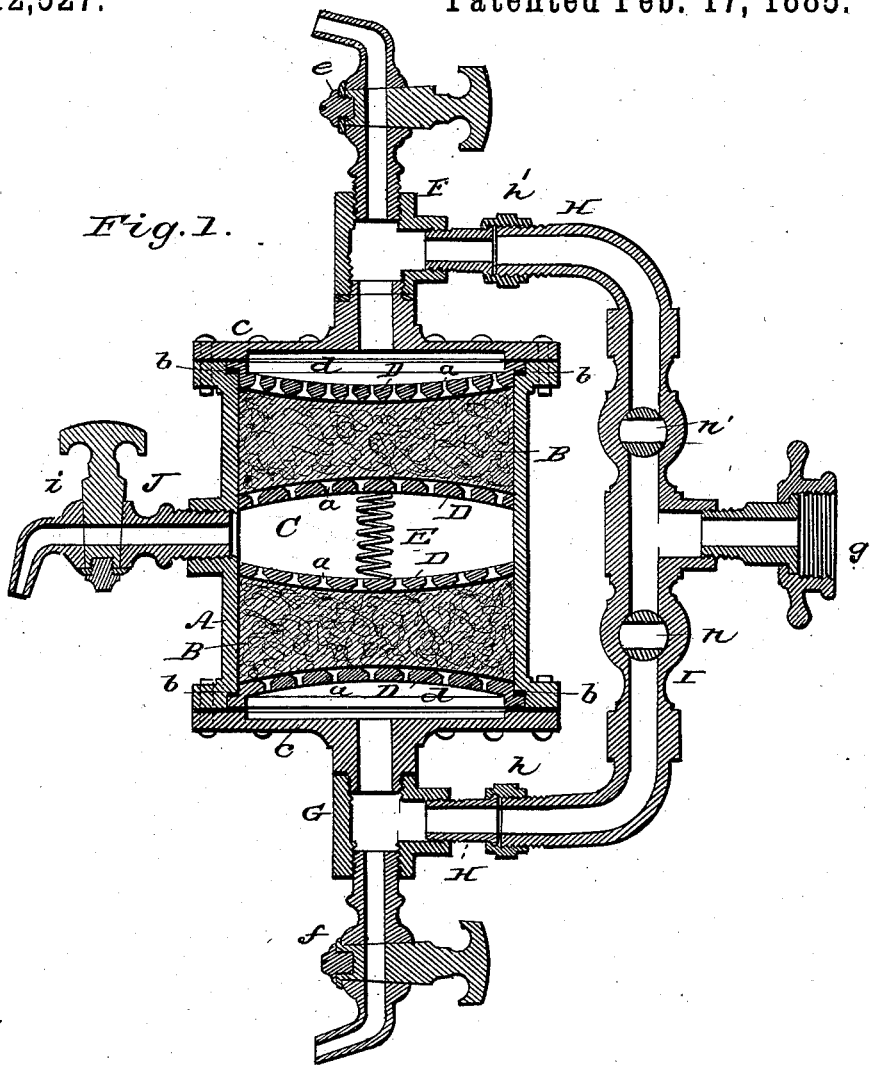
Figure 2:
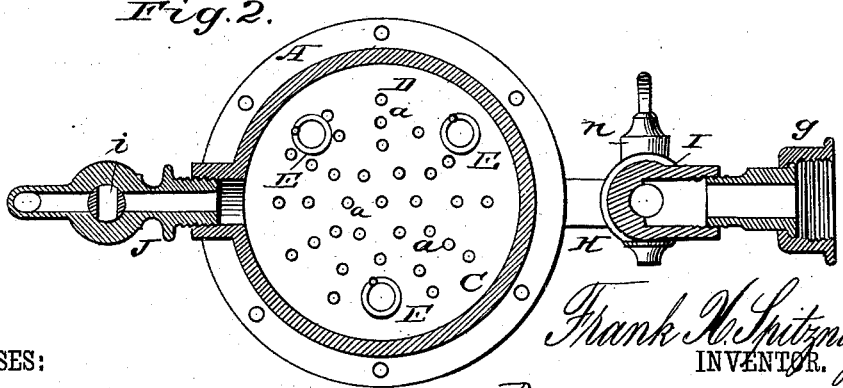

In the accompanying drawings, Figure 1 is a vertical longitudinal section of my improved filter, and Fig. 2 is a transverse section thereof.

In carrying out my invention I employ, preferably, a cylinder, A, of suitable material, which is furnished with filtering material, B, preferably of compressed raw cotton or cotton-batting, which, in order to retain it in a compact form, may be bound by cords or twine. Said filtering material is disposed in two masses or quantities, one being arranged upon each side of and leaving a central water-chamber, C, and each being sandwiched between two plates or disks, D D, said plates or disks being provided with series of water passages or apertures, $a$. The central water-chamber serves to restrict or limit the filtering operation when the said operation is conducted so as to have the water pass through only one half or mass of the filtering medium, the water having an outlet thereat by a pipe and cock, as presently seen. Said chamber also serves, as hereinafter explained, as the central discharge of the water in filtering it from both sides simultaneously. The disks are preferably of a concavo-convex shape, the outer or end ones having the outer sides of their circumferential portions fitted flush with the faces of the cylinder-flanges, which, together with said flanges or other suitable packing-rings, $b$, provide water-tight joints thereat, to prevent the water effecting an entrance between the inner sides of the cylinder and the filtering material. The end plates or disks D have their concavities presented toward the cylinder-heads $c\ c$, thereby forming water-chambers $d\ d$ thereat. The intermediate or inner plates D are held apart and firmly against the filtering material by means of springs E, interposed between and bearing against said plates, to press the filtering material well against the sides of the cylinder and the plates. The end water-chambers, $d$, permit the equalizing of the pressure upon the filtering material.

Connected by the ends of the cylinder A are short pipes F G, with their inner ends screwed (and water-tight packed) into nozzles of the cylinder-heads, their outer ends being provided with cocks $e\ f$. These pipes are connected by curved elbow-pipes H to a centrally-disposed inverted-T-shaped pipe, I, having a coupling, $g$, to effect its union or connection with the service or supply pipe. The elbows H are provided with sockets $h\ h'$, one disposed upon each side of the point of connection between said pipes I and H. A pipe, J, having a cock, $i$, is connected to the cylinder A, so as to communicate with the central water-chamber, C.

The filter having been connected to the supply or service pipe, upon opening either cock $n$ or $n'$ and opening that one of the cocks $e\ f$ farthest from the previously-opened cock $n$ or $n'$, the cock $i$ having been closed, it will be seen that the water will be caused to pass through the entire length of the filter and be discharged at the outlet of the open cock $e$ or $f$, as the case may be, thus effecting the thorough filtration of the water.

Should it happen at any time, by reason of the precipitation or accumulation of sediment or impurities, the flow of water becomes sluggish, this can be remedied and the impediment be removed by closing the previously-opened cocks and opening the cocks that will effect just the reverse action or flow of the water, whereupon all sediment will be washed out and the proper filtration of the water follow.

To filter an increased quantity of water, close both cocks $e$ $f$ and open both of the cocks $n$ $n'$ and the cock $i$.

To clean the filter after such use or method of filtration, connect the outlet of cock $i$ by a hose-pipe to the supply-pipe. Then close cocks $n$ $n'$ and open cocks $e$ $f$, thereby effecting the flushing in two directions and agreeably facilitating the cleaning operation.

When desired to obtain the water at the full maximum pressure, either one of the cocks $n$ $n'$ is opened, as is also that one of the cocks $e$ $f$ nearest to said opened cock $n$ or $n'$, as the case may be.

This filter, while it can be operated in any position it may be put in, it will have been seen is also efficient and expeditious in operation and is readily cleaned.

Having thus fully described my invention, what I claim, and desire to secure by Letters Patent, is—

In a filter, the cylinder or receptacle having its filtering medium disposed in two masses, each being held between apertured plates, the intermediate ones of said masses being held forcibly apart by means of springs, substantially as and for the purpose set forth.

In testimony that I claim the foregoing as my own I have hereunto affixed my signature in presence of two witnesses.

FRANK XAVER SPITZNAGEL.

Witnesses:
ERNEST HODDICKS,
ALFRED R. GEORGES.